(12) United States Patent
Gao et al.

(10) Patent No.: US 10,078,508 B2
(45) Date of Patent: Sep. 18, 2018

(54) INFORMATION PROVIDING METHOD, DEVICE, AND APPARATUS

(71) Applicant: Baidu Online Network Technology (Beijing) Co., Ltd., Beijing (CN)

(72) Inventors: Weiyue Gao, Beijing (CN); Qiuting Qu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/113,698

(22) PCT Filed: Dec. 19, 2014

(86) PCT No.: PCT/CN2014/094305
§ 371 (c)(1),
(2) Date: Jul. 22, 2016

(87) PCT Pub. No.: WO2016/041282
PCT Pub. Date: Mar. 24, 2016

(65) Prior Publication Data
US 2017/0003949 A1 Jan. 5, 2017

(30) Foreign Application Priority Data
Sep. 19, 2014 (CN) .......................... 2014 1 0482465

(51) Int. Cl.
*G06F 8/65* (2018.01)
*G06F 8/61* (2018.01)
(Continued)

(52) U.S. Cl.
CPC .................. *G06F 8/65* (2013.01); *G06F 8/61* (2013.01); *G06F 9/445* (2013.01); *G06F 17/3053* (2013.01); *G06F 8/60* (2013.01)

(58) Field of Classification Search
CPC ... G06F 8/61; G06F 8/65; G06F 9/445; G06F 17/3053; G06F 8/60
See application file for complete search history.

(56) References Cited

U.S. PATENT DOCUMENTS 6,477,703 B1 * 11/2002 Smith ........................ G06F 8/65
717/168
2006/0101457 A1 * 5/2006 Zweifel ..................... G06F 8/65
717/174
(Continued)

FOREIGN PATENT DOCUMENTS

CN          102012826 A     4/2011
CN          102541590 A     7/2012
(Continued)

OTHER PUBLICATIONS

Spinellis, "Package Management Systems," 2012, IEEE Software, vol. 29, Issue 2, pp. 84-86, downloaded from the Internet at <url>:https://ieeexplore.ieee.org.*

(Continued)

*Primary Examiner* — Thuy Dao
*Assistant Examiner* — Stephen Berman
(74) *Attorney, Agent, or Firm* — Seed IP Law Group LLP

(57) ABSTRACT

The present invention provides an information providing method, device and apparatus. The method comprises: generating software installation management information based on terminal personalized information and pieces of software recommended for installation; providing the software installation management information to the user. The device comprise: a software installation management information generating unit, used to generate software installation management information based on the terminal personalized information and the pieces of software recommended for installation; a software installation management information
(Continued)

providing unit, used to provide the software installation management information to the user.

21 Claims, 7 Drawing Sheets

(51) Int. Cl.
*G06F 9/445* (2018.01)
*G06F 17/30* (2006.01)
*G06F 8/60* (2018.01)

(56) References Cited

U.S. PATENT DOCUMENTS

| | | | |
|---|---|---|---|
| 2007/0157192 A1* | 7/2007 | Hoefler | G06F 8/65 717/168 |
| 2011/0009110 A1* | 1/2011 | Liu | G06F 8/61 455/418 |
| 2011/0088026 A1* | 4/2011 | Swann | G06F 8/65 717/173 |
| 2012/0072283 A1 | 3/2012 | DeVore et al. | |
| 2012/0290584 A1* | 11/2012 | De Bona | G06F 8/60 707/741 |
| 2012/0324434 A1* | 12/2012 | Tewari | G06F 8/60 717/168 |
| 2013/0085886 A1 | 4/2013 | Satish et al. | |
| 2013/0159985 A1* | 6/2013 | Gilman | G06F 8/65 717/168 |
| 2013/0326499 A1* | 12/2013 | Mowatt | G06F 8/60 717/177 |
| 2014/0052330 A1* | 2/2014 | Mitchell | G06F 8/65 701/31.5 |
| 2014/0053146 A1* | 2/2014 | Freiter | G06Q 30/0631 717/170 |
| 2014/0101647 A1* | 4/2014 | Huang | G06F 8/65 717/168 |
| 2014/0344254 A1 | 11/2014 | Pu et al. | |
| 2014/0366016 A1* | 12/2014 | Wang | G06F 8/61 717/178 |
| 2015/0020061 A1* | 1/2015 | Ravi | G06F 8/65 717/172 |
| 2015/0120742 A1 | 4/2015 | Liu et al. | |
| 2015/0347280 A1* | 12/2015 | Bennah | G06F 11/3688 714/38.1 |
| 2016/0092768 A1* | 3/2016 | Patil | G06F 8/61 706/46 |

FOREIGN PATENT DOCUMENTS

| | | | |
|---|---|---|---|
| CN | 102622390 | A | 8/2012 |
| CN | 102693229 | A | 9/2012 |
| CN | 102722379 | A | 10/2012 |
| CN | 103034508 | A | 4/2013 |
| CN | 103514496 | A | 1/2014 |
| CN | 103577217 | A * | 2/2014 |

OTHER PUBLICATIONS

Woerndl et al., "A Hybrid Recommender System for Context-aware Recommendations of Mobile Applications," 2007, IEEE 23rd International Conference on Data Engineering Workshop, pp. 871-878, downloaded from the Internet at <url>:https://ieeexplore.ieee.org.*
Costa-Montenegro et al., "Which App? A recommender system of applications in markets: Implementation of the service for monitoring users' interaction," 2012, Expert Systems with Applications, vol. 39, Issue 10, pp. 9367-9375, downloaded from the Internet at <url>:https://ac.els-cdn.com.*

* cited by examiner

INFORMATION PROVIDING METHOD, DEVICE, AND APPARATUS

This application claims the priority of the Chinese application with the filing date of Sep. 19, 2014, the application No. of 201410482465.5, and the title of "Information Providing Method and Device", whose entire disclosure is incorporated herein.

TECHNICAL FIELD

Embodiments of the invention relate to computer technology, more particularly to a method, device, and apparatus for providing information.

BACKGROUND

With the continuous development of computer technology and network communication technology, various kinds of software appear, which greatly satisfy the needs of people in their daily work, life and learning. Accordingly, the software management tools emerged.

Existing software management tools, such as the software management module in Baidu Guard software, provide integrated features, including software downloading, installing, upgrading, and uninstalling, to users. Users can search, through the software management module, the pieces of software that are desirable and complete the installation, and in the meanwhile can upgrade or uninstall specific pieces of software.

Notwithstanding the above, advances in technology have made people's requirements of software management tools higher and higher, traditional software management tools are unable to meet people's growing needs for personalized, customized software management services.

SUMMARY

The present invention provides an information providing method, device and apparatus, to optimize existing software management technology, so as to meet people's growing needs for personalized, customized software management services.

In a first aspect, the embodiments of the present invention provide an information providing method, comprising:

generating software installation management information based on terminal personalized information and pieces of software recommended for installation;

providing the software installation management information to the user.

In a second aspect, the embodiments of the present invention provide an information providing device, comprising:

a software installation management information generating unit, used to generate software installation management information based on the terminal personalized information and the pieces of software recommended for installation;

a software installation management information providing unit, used to provide the software installation management information to the user.

In a third aspect, the embodiments of the present invention provide an apparatus, comprising:

one or more processors;

a memory;

one or more programs, which are stored in the memory and execute the following operation when executed by the one or more processors:

generating software installation management information based on the terminal personalized information and the pieces of software recommended for installation;

providing the software installation management information to the user.

By means of generating software installation management information based on the terminal personalized information and the pieces of software recommended for installation and providing the software installation management information to the user, the embodiment of the present invention solves the following technical problems of the existing software management tools: when delivering information, the existing software management tools do not consider the terminal personalized information, and thus fail to meet the people's growing needs for personalized, customized software management service. The embodiment of the present invention has the technical effect of providing information based on terminal personalized information, which optimizes the existing software management technology, improves the accuracy to provide information for actual needs of the user, meets the growing needs of personalized, customized software management service, and thus greatly improves user experience.

DETAILED DESCRIPTION

Below, the invention is further described in detail along with drawings and embodiments. It is understandable that the specific embodiments described herein are merely used to illustrate, not to limit, the invention. In addition, it should be noted that for the sake of description, the drawings only show structures relevant to the present invention, rather than all the structures.

Embodiment I

Figure 1:
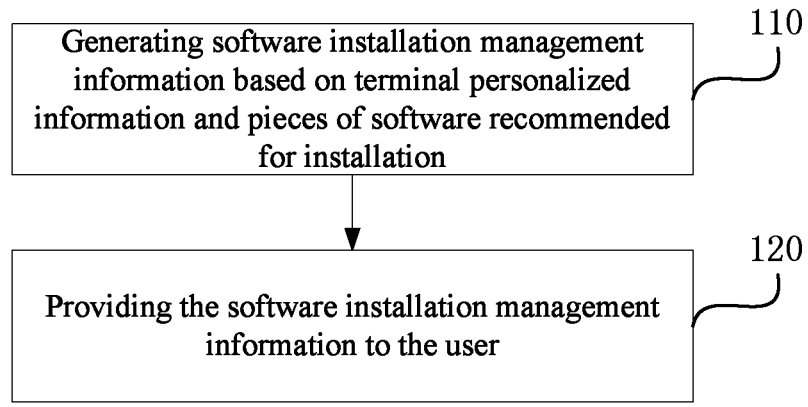
FIG. 1 is a flowchart of an information providing method according to the first embodiment of the present invention.

FIG. 1 is the flowchart for an information providing method according to the first embodiment of the present invention. The method of the present embodiment may be executed by an information providing device. The device can be implemented by means of hardware and/or software, and can generally be integrated into a terminal device (e.g., a desktop, laptop, or mobile device) where a software management client (for example, Baidu Guard) is located; or it can be a subroutine of the software management client. The method according to the embodiment specifically includes the following:

110. Generating software installation management information based on terminal personalized information and pieces of software recommended for installation.

In this embodiment, the client generates software installation management information based on terminal personalized information and pieces of software recommended for installation.

In this embodiment, the terminal personalized information specifically refers to the personalized information of the terminal device where the client is located. Accordingly, different terminal devices may have the same or different terminal personalized information.

Herein, the terminal personalized information may include: information for the pieces of software already installed (e.g., software names, software installation times, software types, the number of the pieces of software, or other information); it may also include information of the terminal user (e.g., user age, gender, occupation, or software usage habit, and etc.); it may also include terminal operating system information (information such as operating system installation time or operating system type, and etc.); it may also include any combination of the aforementioned three types of information, which is not limited by the embodiment.

In this embodiment, the pieces of software recommended for installation specifically refers to a software list for at least one piece of pieces of software that the software management client may recommend to the user.

In this embodiment, the pieces of software recommended for installation may be pre-installed in the terminal device where the client is located, or downloaded from a server according to actual needs. It is not limited herein.

For example, when the user is installing the client in the terminal device, the client can dispose the pieces of software recommended for installation in a memory area set in the mobile terminal device, and can upgrade the memory for the pieces of software recommended for installation in real time according to actual needs; or when the user turns on a piece of software in the client, the client sends to the server an acquisition request for the pieces of software recommended for installation, to obtain the pieces of software recommended for installation.

In one specific example, when the user installs the Baidu Guard client, the software in the client will dispose a software list of 410 pieces of software as the pieces of software recommended for installation in the terminal device, and upgrade the pieces of software recommended for installation at predetermined time intervals (for example, seven days or 10 days).

Herein, the pieces of software recommended for installation may include attribute information for the pieces of software recommended for installation, such as: popularity weighting values of the pieces of software, software names, user ratings of the software, the number of software reviewers, software developers, software types, software download links, software versions, and other information, which are not limited herein.

In this embodiment, the software installation management information specifically refers to information to providing guidance for the user to install new pieces of software or manage (uninstall or upgrade, etc.) those pieces of software already installed.

Herein, the software installation management information may include information for the pieces of software to be installed; it may also include information for the pieces of software to be upgraded; it may include both information for the pieces of software to be installed and the information for pieces of software to be upgraded. It is not limited herein.

Herein, the information for the pieces of software to be installed is used to provide related information for the pieces of software that can be installed in the terminal device; the information for the pieces of software to be upgraded is used to provide related information for the pieces of software already installed in the terminal device that can be upgraded.

120. Providing the software installation management information to the user.

In this embodiment, the client provides the software installation management information to the user.

In a preferred embodiment of the present embodiment, the step of the client's providing the software installation management information to the user may specifically include: the client displaying the software installation management information on the home page of software management pages.

Herein, the client can directly provide the software installation management information to the user, it can also carry out display layout design on the software installation management information based on different user attributes (for example, user of a new machine and user of a used machine), and then provide the information to the user, which is not limited in the present embodiment.

By means of generating software installation management information based on the terminal personalized information and the pieces of software recommended for installation and providing the software installation management information to the user, the embodiment of the present invention solves the following technical problems of the existing software management tools: when delivering information, the existing software management tools do not consider the terminal personalized information, and thus fail to meet the people's growing needs for personalized, customized software management service. The embodiment of the present invention has the technical effect of providing information based on terminal personalized information, which optimizes the existing software management technology, improves the accuracy to provide information for actual needs of the user, meets the growing needs of personalized, customized software management service, and thus greatly improves user experience.

Embodiment II

Figure 2:
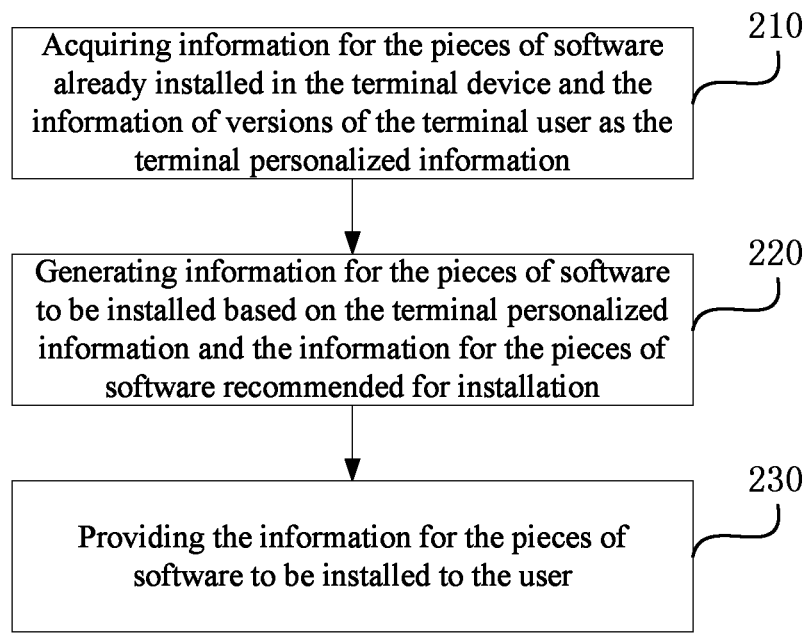
FIG. 2 is a flowchart of an information providing method according to the second embodiment of the present invention.

FIG. 2 is the flowchart for an information providing method according to the second embodiment of the present invention. The present embodiment uses the above-described embodiments as the basis for optimization. In this embodiment, it is preferable to optimize the software installation management information into the information for the pieces of software to be installed; preferably, the terminal personalized information is optimized into the information for the pieces of software already installed in the terminal device and/or information of the terminal user.

Accordingly, the method according to the embodiment specifically comprises the following operations:

210. Acquiring information for the pieces of software already installed in the terminal device and the information of the terminal user as the terminal personalized information.

In this embodiment, the client acquires information for the pieces of software already installed in the terminal device and the information of the terminal user as the terminal personalized information.

220. Generating information for the pieces of software to be installed based on the terminal personalized information and the information for the pieces of software recommended for installation.

In this embodiment, the client generates information for the pieces of software to be installed based on the terminal personalized information and the information for the pieces of software recommended for installation.

In one preferred embodiment of the present embodiment, the client can, after acquiring information for the pieces of software already installed in the terminal device as the terminal personalized information, exclude the pieces of software already installed in the terminal device from the pieces of software recommended for installation, and generate the information for the pieces of software recommended for installation.

In another preferred embodiment of the present embodiment, the client can, after acquiring information of the terminal user as the terminal personalized information, sort the pieces of software recommended for installation based on the information of the terminal user and/or the popularity weighting values of the pieces of software recommended for installation, and select the information for the pieces of software to be installed from the result of sorting.

In another preferred embodiment of the present embodiment, the client can, after acquiring information for the pieces of software already installed in the terminal device and the information of the terminal user as the terminal personalized information, exclude the pieces of software already installed in the terminal device from the pieces of software recommended for installation, generate a first software group; sort the first software group according to the information of the terminal user and/or the popularity weighting values of the pieces of software recommended for installation; and select the information for the pieces of software to be installed from the result of sorting. It is not limited herein.

230. Providing the information for the pieces of software to be installed to the user.

By means of acquiring information for the pieces of software already installed in the terminal device and the information of the terminal user as the terminal personalized information, generating the information for the pieces of software to be installed based on the terminal personalized information and the information for the pieces of software recommended for installation, and providing the information for the pieces of software to be installed to the user, the embodiment of the present invention solves the following technical problems of the existing software management tools: when delivering information, the existing software management tools do not consider the terminal personalized information, and thus fail to meet the people's growing needs for personalized, customized software management service. The embodiment of the present invention has the technical effect of providing information based on terminal personalized information, which optimizes the existing software management technology, improves the accuracy to provide information for actual needs of the user, meets the growing needs of personalized, customized software management service, and thus greatly improves user experience.

Embodiment III

Figure 3:
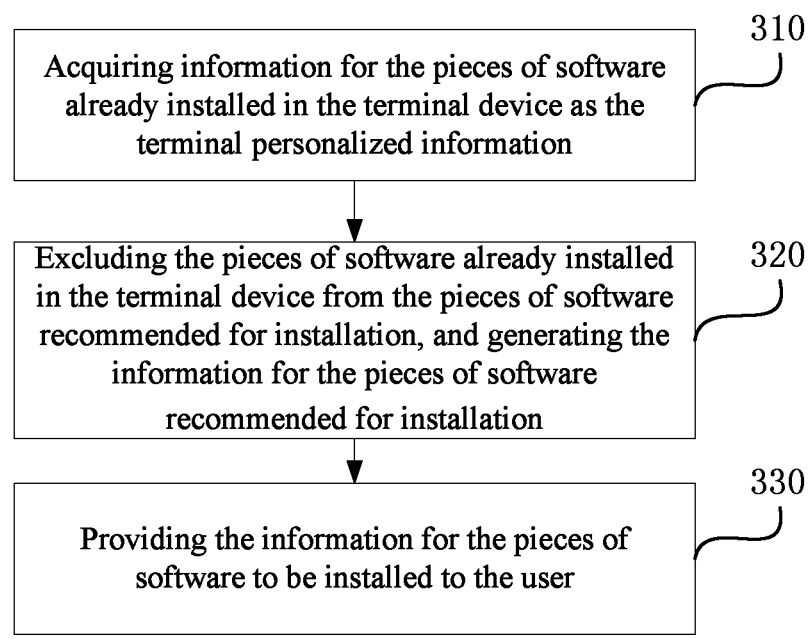
FIG. 3 is a flowchart of am information providing method according to the third embodiment of the present invention.

FIG. 3 is the flowchart for an information providing method according to the third embodiment of the present invention. The present embodiment uses the above-described embodiments as the basis for optimization. It is preferable to optimize the step of generating information for the pieces of software to be installed based on the terminal personalized information and the information for the pieces of software recommended for installation into: acquiring information for the pieces of software already installed in the terminal device as the terminal personalized information, excluding the pieces of software already installed in the terminal device from the pieces of software recommended for installation, and generating the information for the pieces of software recommended for installation.

Accordingly, the method according to the embodiment specifically comprises the following operations:

310. Acquiring information for the pieces of software already installed in the terminal device as the terminal personalized information.

320. Excluding the pieces of software already installed in the terminal device from the pieces of software recommended for installation, and generating the information for the pieces of software recommended for installation.

Currently, the existing software management client recommend software to the user generally based on the number of downloads of the software, i.e., the higher the number of downloads of a piece of software, the higher it is ranked in the recommendation list. Nevertheless, the current way does not consider the status quo of the actual software installation of the user, it is likely that most of the pieces of software recommended for installation by the client have been already installed in the terminal device, i.e., the probability of the pieces of software recommended for installation to be actually selected by the user is low, accordingly, the probability of clicking and downloading by the user is also low, which gives poor result for the recommendation.

In this embodiment, the client excludes the pieces of software already installed in the terminal device from the pieces of software recommended for installation, and generates the information for the pieces of software to be installed, so as to solve the problem existing in the prior art, to make it possible to recommend pieces of software that are more likely to be needed by the user, and to increase the probability of being selected by the user.

330. Providing the information for the pieces of software to be installed to the user.

By means of acquiring information for the pieces of software already installed in the terminal device as the terminal personalized information, excluding the pieces of software already installed in the terminal device from the information for the pieces of software recommended for installation, generating information for the pieces of software to be installed, and providing the information for the pieces of software to be installed to the user, the embodiment of the present invention solves the following technical problems of the existing software management tools: when delivering information, the existing software management tools do not consider the terminal personalized information, and thus fail to meet the people's growing needs for personalized, customized software management service. The embodiment of the present invention has the technical effect of providing information based on terminal personalized information, which optimizes the existing software management technology, improves the accuracy to provide information for actual needs of the user, meets the growing needs of personalized, customized software management service, and thus greatly improves user experience.

Embodiment IV

Figure 4:
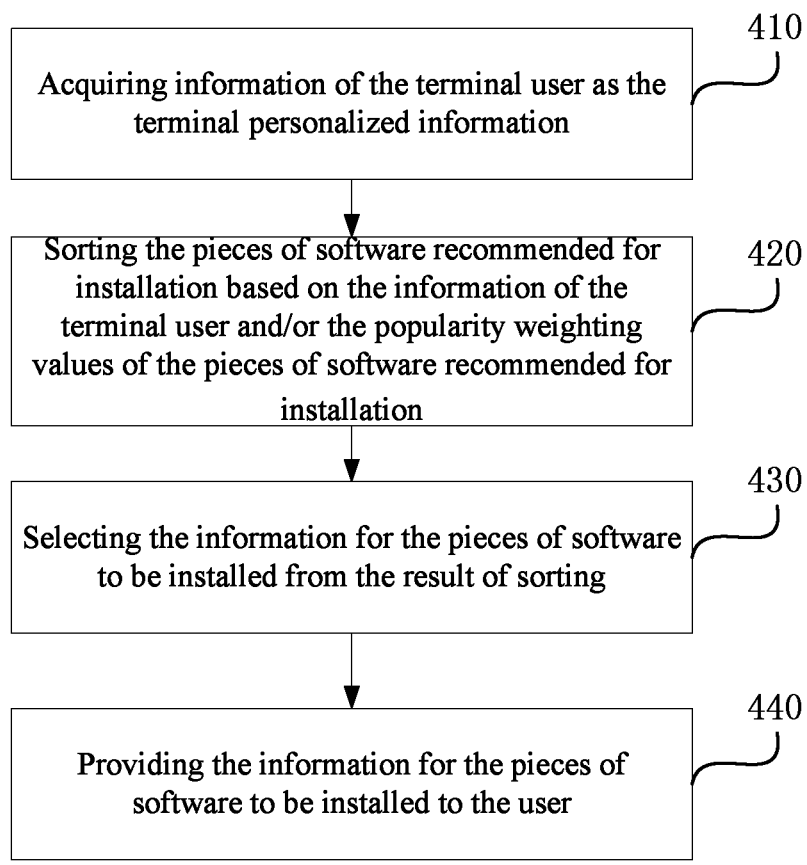
FIG. 4 is a flowchart of an information providing method according to the fourth embodiment of the present invention.

FIG. 4 is the flowchart for an information providing method according to the fourth embodiment of the present invention. The present embodiment uses the above-described embodiments as the basis for optimization. In this embodiment, it is preferable to optimize the step of generating software installation management information based on the terminal personalized information and the information for the pieces of software recommended for installation into: acquiring information of the terminal user as the terminal personalized information, sorting the pieces of software recommended for installation based on the information of the terminal user and/or the popularity weighting values of the pieces of software recommended for installation, and selecting the information for the pieces of software to be installed from the result of sorting.

Accordingly, the method of this embodiment comprises the following operations:

410. Acquiring information of the terminal user as the terminal personalized information.

In this embodiment, the client acquires information of the terminal user as the terminal personalized information.

Herein, the information of the terminal user includes: user age, gender, occupation, software usage, or other information, or combinations of the above information. It is not limited herein.

Herein, the client can acquire the information of the terminal user through the configuration document submitted by the terminal user (configuration file submitted through registration information by the user), or through carrying out behavior analysis via the logs of internet surfing of the terminal user. It is not limited herein.

420. Sorting the pieces of software recommended for installation based on the information of the terminal user and/or the popularity weighting values of the pieces of software recommended for installation.

In this embodiment, the client sorts the pieces of software recommended for installation based on the information of the terminal user and/or the popularity weighting values of the pieces of software recommended for installation.

Herein, each piece of recommended software has a popularity weighting value, which reflects the trend of downloading of the piece of software or level of interest of most users.

In a preferred embodiment of the present embodiment, the popularity weighting value H of the piece of software recommended for installation is obtained with the actual number of downloads D, search popularity value S, company size index C, and network rating W and number of network rating participators.

In one specific example, $H=k_1*D+k_2*S+k_3*C+k_4*W$; wherein, $k_1$, $k_2$, $k_3$ and $k_4$ are predetermined scale factors.

Herein, the popularity weighting values of the pieces of software recommended for installation and the corresponding pieces of software recommended for installation are correspondingly stored in the terminal device, and can be upgraded in real time based on actual needs.

In this embodiment, different users have different demands for the software. For example, a male user desires more for game and entertainment software; a female user desires more for more shopping software; a user under 20 desires more for online gaming software; in addition, which category of the software a user is inclined to can by determined by analyzing the user's software usage.

In a preferred embodiment of the present embodiment, the client can set the user weighting value for each piece of software recommended for installation based on the user information, and sort the pieces of software recommended for installation based on a combination of the user weighting value and the popularity weighting value.

In another preferred embodiment of the present embodiment, the client may first sort the pieces of software recommended for installation based on the popularity weighting values, and then make slight changes to the sorting based on the user information.

Of course, as one skilled in the art understands, other ways can be adopted to sort the pieces of software recommended for installation based on the user information and the popularity weighting values of the pieces of software recommended for installation. It is not limited herein.

430. Selecting the information for the pieces of software to be installed from the result of sorting.

In this embodiment, the client selects the information for the pieces of software to be installed from the result of sorting.

Herein, the client can directly take the result of sorting for the pieces of software recommended for installation as the information for the pieces of software to be installed; it can also select a predetermined number (such as 20. 25, or 50) of software recommended for installation as the information for the pieces of software to be installed. It is not limited herein.

440. Providing the information for the pieces of software to be installed to the user.

By means of generating software installation management information based on the terminal personalized information and the information for the pieces of software recommended for installation, and providing the information for the pieces of software to be installed to the user, the embodiment of the present invention solves the following technical problems of the existing software management tools: when delivering information, the existing software management tools do not consider the terminal personalized information, and thus fail to meet the people's growing needs for personalized, customized software management service. The embodiment of the present invention has the technical effect of providing information based on terminal personalized information, which optimizes the existing software management technology, improves the accuracy to provide information for actual needs of the user, meets the growing needs of personalized, customized software management service, and thus greatly improves user experience.

Embodiment V

Figure 5:
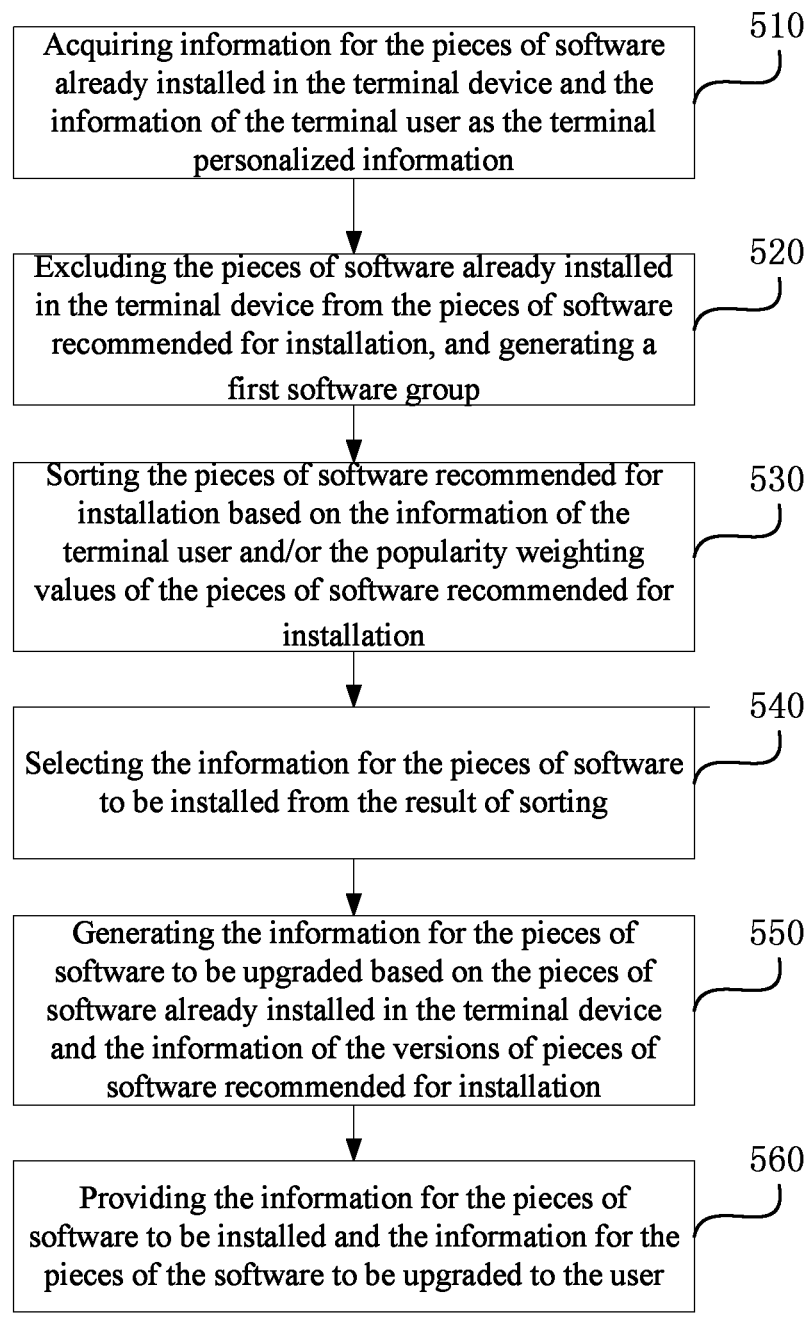
FIG. 5 is a flowchart of an information providing method according to the fifth embodiment of the present invention.

FIG. 5 is the flowchart for an information providing method according to the fifth embodiment of the present invention. The present embodiment uses the above-described embodiments as the basis for optimization. In this embodiment, it is preferable that the software installation management information further includes: information for the pieces of software to be upgraded; and it is preferable to optimize the step of generating software installation management information based on the terminal personalized information and the information for the pieces of software recommended for installation into: acquiring information for the pieces of software already installed in the terminal device and the information of the terminal user as the terminal personalized information, excluding the pieces of software already installed in the terminal device from the pieces of software recommended for installation, generating a first software group; sorting the first software group based on the information of the terminal user and/or the weighting values of the pieces of software recommended for installation; selecting the information for the pieces of software to be installed from the result of sorting; and generating the information for the pieces of software to be upgraded based on the pieces of software already installed in the terminal device and the information of the versions of pieces of software recommended for installation.

Accordingly, the method according to the embodiment comprises the following operations:

510. Acquiring information for the pieces of software already installed in the terminal device and the information of the terminal user as the terminal personalized information.

520. Excluding the pieces of software already installed in the terminal device from the pieces of software recommended for installation, and generating a first software group.

In this embodiment, the client first excludes the pieces of software already installed in the terminal device from the pieces of software recommended for installation, and then sorts the pieces of software recommended for installation based on the information of the user and the weighting values of the pieces of software recommended for installation, so as to further improve the probability of being selected by the user and recommend pieces of software that are more likely to be needed by the user.

530. Sorting the pieces of software recommended for installation based on the information of the terminal user and/or the popularity weighting values of the pieces of software recommended for installation.

540. Selecting the information for the pieces of software to be installed from the result of sorting.

550. Generating the information for the pieces of software to be upgraded based on the pieces of software already installed in the terminal device and the information of the versions of versions of pieces of software recommended for installation In this embodiment, the client generates the information for the pieces of software to be upgraded based on the pieces of software already installed in the terminal device and the information of the versions of pieces of software recommended for installation Herein, the client compares each piece of software already installed with the version of the corresponding piece of software recommended for installation, so as to determine which pieces of software among those already installed in the terminal device need to be upgraded, and thus to generate the information for the pieces of software to be upgraded.

560. Providing the information for the pieces of software to be installed and the information for the pieces of the software to be upgraded to the user.

In this embodiment, the client provides the information for the pieces of software to be installed and the information for the pieces of the software to be upgraded to the user.

By means of generating software installation management information based on the terminal personalized information and the information for the pieces of software recommended for installation, and providing the software installation management information to the user, the embodiment of the present invention solves the following technical problems of the existing software management tools: when delivering information, the existing software management tools do not consider the terminal personalized information, and thus fail to meet the people's growing needs for personalized, customized software management service. The embodiment of the present invention has the technical effect of providing information based on terminal personalized information, which optimizes the existing software management technology, improves the accuracy to provide information for actual needs of the user, meets the growing needs of personalized, customized software management service, and thus greatly improves user experience.

Embodiment VI

Figure 6:
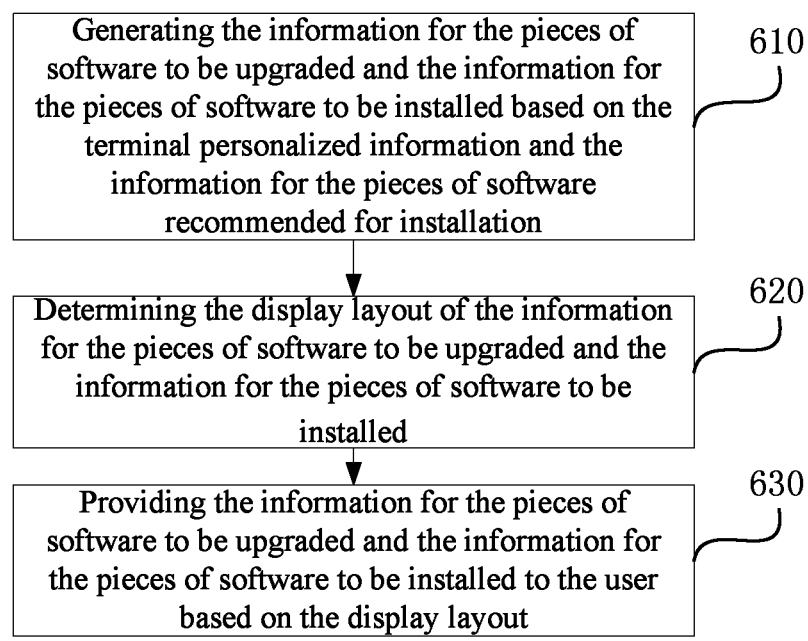
FIG. 6 is a flowchart of an information providing method according to the sixth embodiment of the present invention.

FIG. 6 is the flowchart for an information providing method according to the sixth embodiment of the present invention. The present embodiment uses the above-described embodiments as the basis for optimization. In this embodiment, it is preferable to optimize the step of providing the software installation management information to the user into: determining the display layout of the information for the pieces of software to be upgraded and the information for the pieces of software to be installed; providing the software management information to the user based on the display layout.

Accordingly, the method of this embodiment comprises the following operations:

610. Generating the information for the pieces of software to be upgraded and the information for the pieces of software to be installed based on the terminal personalized information and the information for the pieces of software recommended for installation.

620. Determining the display layout of the information for the pieces of software to be upgraded and the information for the pieces of software to be installed.

In the prior art, the software management client pushes the same message to different terminal devices. Users of different terminal devices however have different needs for the software management information.

For example, the user of a new machine is more concerned about installation of new software; and the use of a used machine may be more concerned about management of upgrading of software already installed.

In this embodiment, the client determines the display layout of the information for the pieces of software to be upgraded and the information for the pieces of software to be installed based on the information of the user attribute, so as to provide the software management information that satisfies the needs of the user as much as possible in a predetermined display layout (emphasis display, top display, front display, and etc.) for different user attributes, so as to improve user experience.

In one preferred embodiment of the present embodiment, determining the display layout of the information for the pieces of software to be upgraded and the information for the pieces of software to be installed of comprises:

If it is determined that the number of the pieces of software already installed is less than a predetermined number threshold, the display layout position of the information for the pieces of software to be installed is provided before that of the information for the pieces of software to be upgraded; otherwise the display layout position of the information for the pieces of software to be upgraded is provided before that of the information for the pieces of software to be installed.

In the preferred embodiments, the client determines whether the terminal device is a new machine or not through the number of the pieces of software already installed (for example, the client takes a terminal device with less than 20 pieces of software already installed as a new machine); for the user of a new machine, the display layout position of the information for the pieces of software to be installed is provided before that of the information for the pieces of software to be upgraded (preferably, display on the top); for the user of a used machine, the display layout position of the information for the pieces of software to be upgraded is provided before that of the information for the pieces of software to be installed.

In another preferred embodiment of the present embodiment, determining the display layout of the information for the pieces of software to be upgraded and the information for the pieces of software to be installed of comprises:

If it is determined that installation time of the operating system of terminal device is less than a predetermined time threshold, the display layout position of the information for the pieces of software to be installed is provided before that of the information for the pieces of software to be upgraded; otherwise the display layout position of the information for the pieces of software to be upgraded is provided before that of the information for the pieces of software to be installed.

In the preferred embodiments, the client determines whether the terminal device is a new machine or not through the time the user installed the operating system (for example, the client takes a terminal device with less than a 5-day difference between the installation time of the operating system and the current time as the user of a new machine); for the user of a new machine, the display layout position of the information for the pieces of software to be installed is provided before that of the information for the pieces of software to be upgraded (preferably, display on the top); for the user of a used machine, the display layout position of the information for the pieces of software to be upgraded is provided before that of the information for the pieces of software to be installed.

630. Providing the information for the pieces of software to be upgraded and the information for the pieces of software to be installed to the user based on the display layout.

In this embodiment, the client provides the information for the pieces of software to be upgraded and the information for the pieces of software to be installed to the user based on the display layout.

By means of generating software installation management information based on the terminal personalized information and the information for the pieces of software recommended for installation, and providing the software installation management information to the user, the embodiment of the present invention solves the following technical problems of the existing software management tools: when delivering information, the existing software management tools do not consider the terminal personalized information, and thus fail to meet the people's growing needs for personalized, customized software management service. The embodiment of the present invention has the technical effect of providing information based on terminal personalized information, which optimizes the existing software management technology, improves the accuracy to provide information for actual needs of the user, meets the growing needs of personalized, customized software management service, and thus greatly improves user experience.

Embodiment VII

Figure 7:
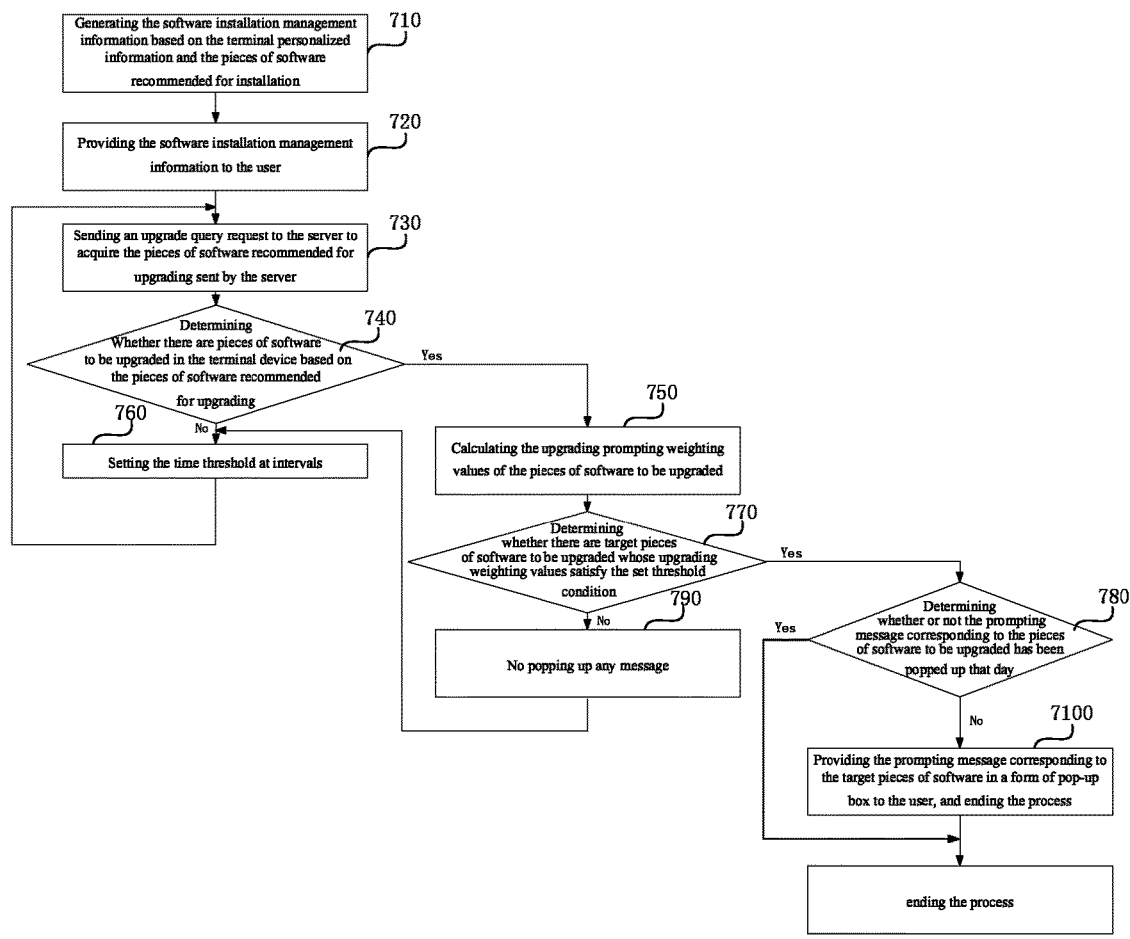
FIG. 7 is a flowchart of an information providing method according to the seventh embodiment of the present invention.

FIG. 7 is the flowchart for an information providing method according to the seventh embodiment of the present invention. The present embodiment uses the above-described embodiments as the basis for optimization. In this embodiment, it is preferably to further comprise: sending an upgrade query request to the server to acquire pieces of software recommended for upgrading by the server; providing the prompting message corresponding to the pieces of software to be upgraded to the user if it is determined that there are some pieces of software to be upgraded in the terminal device based on the pieces of software recommended for upgrading.

Further, it is preferable to optimize the step of providing the prompting message corresponding to the pieces of software to be upgraded to the user if it is determined that there are some pieces of software to be upgraded in the terminal device based on the pieces of software recommended for upgrading into: acquiring a predetermined number of target pieces of software to be upgraded based on the upgrading prompting weighting values of the pieces of software to be upgraded if it is determined that there are some pieces of software to be upgraded in the terminal device based on the pieces of software recommended for upgrading; providing the prompting message corresponding to the target pieces of software in a form of pop-up box to the user.

Accordingly, the method of this embodiment comprises the following operations:

710. Generating the software installation management information based on the terminal personalized information and the pieces of software recommended for installation.

720. Providing the software installation management information to the user.

730. Sending an upgrade query request to the server to acquire the pieces of software recommended for upgrading sent by the server.

This embodiment takes into account the possibility that in the practical operation, the user ignores the information for the pieces of software to be upgraded pushed by the client. The client pushes to the user the prompting message corresponding to the pieces of software used in high frequency and pieces of software with high popularity weighting values once more in the form of pop-up box, which further increase the probability of the information actually needed being selected by the user. In addition, in order to prevent disturbance of the message-pushing way of pop-up box to the user, in this embodiment, it can be set to push to the user the prompting message corresponding to the pieces of software to be upgraded in a form of pop-up box at most once a day.

740. Determining whether there are pieces of software to be upgraded in the terminal device based on the pieces of software recommended for upgrading: if there are, executing 750; otherwise, executing 760.

750. Calculating the upgrading prompting weighting values of the pieces of software to be upgraded, executing 770.

In this embodiment, the client calculates the upgrading prompting weighting values of the pieces of software to be upgraded.

Herein, the upgrading prompting weighting values can be obtained through calculation with the parameters of frequency of use of the pieces of software to be upgraded, the popularity weighting values of pieces of software to be upgraded, and etc. It is not limited herein.

In one embodiment, the upgrading prompting weighting value $U=k1*F$, among which; $k1=1$ means the popularity weighting value of a piece of software to be upgraded is ranked in the top 100 among the pieces of software recommended for installation, $k1=0$ means the popularity weighting value of the piece of software to be upgraded is no ranked in the top 100 among the pieces of software recommended for installation; and F is the frequency of use of the pieces of software to be upgraded in the terminal device.

760. Setting the time threshold at intervals, returning to 830.

In this embodiment, the time threshold may be predetermined based on actual conditions, e.g., 3 hours, 4 hours, or 5 hours. It is not limited herein by this embodiment.

770. Determining whether there are target pieces of software to be upgraded whose upgrading weighting values satisfy the set threshold condition: if there are, executing 780; otherwise, executing 790.

In this embodiment, the client determines whether there are target pieces of software to be upgraded whose upgrading weighting values satisfy the set threshold condition.

Herein, the threshold condition may be predetermined based on actual situation. For example, one can obtain all the pieces of software whose upgrading weighting values exceed a predetermined threshold as the target pieces of software to be upgraded; or, one can sort the upgrading weighting values in the descending order, and obtain the pieces of software corresponding to the top three upgrading weighting values as the target pieces of software to be upgraded.

780. Determining whether or not the prompting message corresponding to the pieces of software to be upgraded has been popped up that day: if yes, ending the process; otherwise, executing 7100.

790. No popping up any message, returning to 760.

7100. Providing the prompting message corresponding to the target pieces of software in a form of pop-up box to the user, and ending the process.

By means of generating software installation management information based on the terminal personalized information and the information for the pieces of software recommended for installation, and providing the software installation management information to the user, the embodiment of the present invention solves the following technical problems of the existing software management tools: when delivering information, the existing software management tools do not consider the terminal personalized information, and thus fail to meet the people's growing needs for personalized, customized software management service. The embodiment of the present invention has the technical effect of providing information based on terminal personalized information, which optimizes the existing software management technology, improves the accuracy to provide information for actual needs of the user, meets the growing needs of personalized, customized software management service, and thus greatly improves user experience.

On the basis of the above embodiments, the method further comprises: providing additional software information to the user.

Herein, the additional software information comprises at least one of following: software content comparison information, software usage tips, software provider information, software peripheral information, and software news information.

The benefits of the above are: it can further help the user to complete downloading, upgrading and uninstalling of the software, and can further improve user experience. For example, before a user downloads a piece of video software, the client can provide the software content comparison information between different pieces of video software to the user, to help the user to choose one piece more suitable to himself; when the user is downloading a piece of software, the client can provide the software usage prompting message to the user, so that the user can quickly grasp the way to use the software after he completes the downloading.

Figure 8:
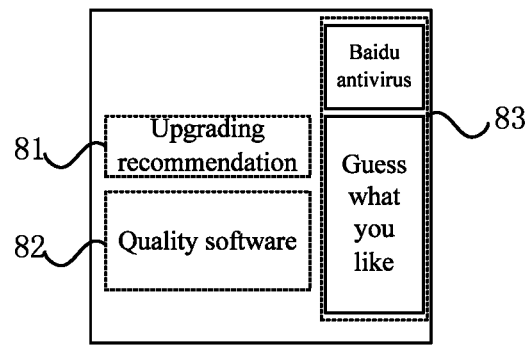
FIG. 8 is a schematic view of human-machine interaction on the first page of a software management module according to the seventh embodiment of the present invention.

FIG. 8 shows the schematic view of human-machine interaction on the first page of a software management module according to the seventh embodiment of the present invention. As shown in FIG. 8, the first page of a software management module is the first page of the software management of Baidu Guard. In the first, the information for pieces of software to be upgraded 81, the information for pieces of software to be downloaded 82, and the additional software message 83 are simultaneous provided to the user.

Herein the upper part of the block of the additional information 83, i.e., the Baidu antivirus region is recommendation for the additional software message; the part for guessing of what you like is recommendation of software recommended for installation.

Of course, those skilled in the art will appreciate that the content recommended by the additional software information and the size of the block can be provided based on actual situation. It is not limited herein.

Embodiment VIII

Figure 9:
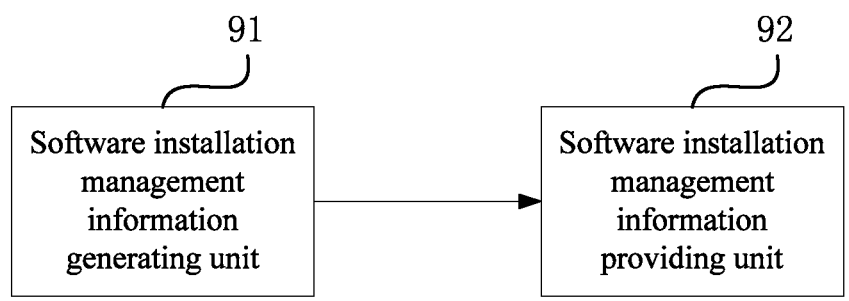
FIG. 9 is a flowchart of an information providing device according to the eighth embodiment of the present invention.

FIG. 9 is the flowchart for an information providing device according to the eighth embodiment of the present invention. As shown in FIG. 9, the device comprises the following:

A software installation management information generating unit 91, used to generate software installation management information based on the terminal personalized information and the pieces of software recommended for installation.

A software installation management information providing unit 92, used to provide the software installation management information to the user.

By means of generating software installation management information based on the terminal personalized information and software recommended for installation, and providing the software installation management information to the user, the embodiment of the present invention solves the following technical problems of the existing software management tools: when delivering information, the existing software management tools do not consider the terminal personalized information, and thus fail to meet the people's growing needs for personalized, customized software management service. The embodiment of the present invention has the technical effect of providing information based on terminal personalized information, which optimizes the existing software management technology, improves the accuracy to provide information for actual needs of the user, meets the growing needs of personalized, customized software management service, and thus greatly improves user experience.

On the basis of the above embodiments, the software installation management information may include information for the pieces of software to be installed; the terminal personalized information is the information for the pieces of software already installed in the terminal device and/or the information of the terminal user.

On the basis of the above embodiments, the software installation management information providing unit 92 may further be specifically used for: acquiring information for the pieces of software already installed in the terminal device and the information terminal user as the terminal personalized information; excluding the pieces of software already installed in the terminal device from the pieces of software recommended for installation, and generating a first software group; sorting the first software group based on the information of the terminal user and/or the weighting values of the pieces of software recommended for installation; selecting the information for the pieces of software to be installed from the result of sorting.

On the basis of the above embodiments, the software installation management information may include: information for the pieces of software to be upgraded.

The software installation management information generating unit can be further used for: generating the information for the pieces of software to be upgraded based on the information for the pieces of software already installed in the terminal device and the information of the versions of pieces of software recommended for installation.

On the basis of the above embodiments, the software installation management information providing unit may comprise: a display layout determining sub-unit, for determining the display layout of the information for the pieces of software to be upgraded and the information for the pieces of software to be installed; an information providing sub-unit, for providing the software management information to the user according to the display layout.

Herein, the display layout determining sub-unit may be used for: if it is determined that the number of the pieces of software already installed is less than a predetermined number threshold, providing the display layout position of the information for the pieces of software to be installed before that of the information for the pieces of software to be upgraded; otherwise providing the display layout position of the information for the pieces of software to be upgraded before that of the information for the pieces of software to be installed.

Or, if it is determined that installation time of the operating system of terminal device is less than a predetermined time threshold, providing the display layout position of the information for the pieces of software to be installed before that of the information for the pieces of software to be upgraded; otherwise providing the display layout position of the information for the pieces of software to be upgraded before that of the information for the pieces of software to be installed.

On the basis of the above embodiments, the device may further comprise: an upgrading recommendation acquisition unit, for sending an upgrade query request to the server to acquire the pieces of software recommended for upgrading sent by the server; an prompting message information providing unit, for providing the prompting message corresponding to the pieces of software to be upgraded to the user if it is determined that there are some pieces of software to be upgraded in the terminal device based on the pieces of software recommended for upgrading.

Herein, the upgrading recommendation acquisition unit may be specifically used for: acquiring a predetermined number of target pieces of software to be upgraded based on the upgrading prompting weighting values of the pieces of software to be upgraded if it is determined that there are some pieces of software to be upgraded in the terminal device based on the pieces of software recommended for upgrading; providing the prompting message corresponding to the target pieces of software in a form of pop-up box to the user.

The information providing device of the embodiment of the present invention can be used to carry out any information providing method according to any embodiment of the present invention, with the same function modules, being able to realize the same beneficial effects.

Embodiment IX

Embodiment of the invention further provides a non-volatile computer storage medium, the computer storage medium storing one or more programs, which, when the one or more programs are executed by a device, makes the device execute the following operations:

generating software installation management information based on the terminal personalized information and the pieces of software recommended for installation;

providing the software installation management information to the user.

Preferably, when the storage medium is subject to the above operations carried out with the above device, the software installation management information includes the information for the pieces of software to be installed; the personalized information includes: information for the pieces of software already installed and/or the information of the terminal user.

Further, the step of generating software installation management information based on the terminal personalized information and the pieces of software recommended for installation comprises:

excluding the pieces of software already installed in the terminal device from the pieces of software recommended for installation, and generating the information for the pieces of software to be installed.

Further, the step of generating software installation management information based on the terminal personalized information and the pieces of software recommended for installation comprises:

sorting the pieces of software recommended for installation based on the information of the terminal user and/or the popularity weighting values of the pieces of software recommended for installation;

selecting the information for the pieces of software to be installed from the result of sorting.

Further, the step of generating software installation management information based on the terminal personalized information and the pieces of software recommended for installation comprises:

excluding the pieces of software already installed in the terminal device from the pieces of software recommended for installation, and generating a first software group;

sorting the first software group based on the information of the terminal user and/or the popularity weighting values of the pieces of software recommended for installation;

selecting the information for the pieces of software to be installed from the result of sorting.

Further, the software installation management information also includes: the information for the pieces of software to be upgraded.

The step of generating software installation management information based on the terminal personalized information and the pieces of software recommended for installation further comprises:

generating the information for the pieces of software to be upgraded based on the information for the pieces of software already installed in the terminal device and the information of versions of the pieces of software recommended for installation.

Further, the step of providing the software installation management information to the user comprises:

determining the display layout of the information for the pieces of software to be upgraded and the information for the pieces of software to be installed;

providing the software management information to the user according to the display layout.

Further, the step of determining the display layout of the information for the pieces of software to be upgraded and the information for the pieces of software to be installed specifically comprises:

if it is determined that the number of the pieces of software already installed is less than a predetermined number threshold, providing the display layout position of the information for the pieces of software to be installed before that of the information for the pieces of software to be upgraded;

otherwise providing the display layout position of the information for the pieces of software to be upgraded before that of the information for the pieces of software to be installed.

Further, the step of determining the display layout of the information for the pieces of software to be upgraded and the information for the pieces of software to be installed specifically comprises:

if it is determined that installation time of the operating system of terminal device is less than a predetermined time threshold, providing the display layout position of the information for the pieces of software to be installed before that of the information for the pieces of software to be upgraded;

otherwise providing the display layout position of the information for the pieces of software to be upgraded before that of the information for the pieces of software to be installed.

Further, it also comprises:

sending an upgrade query request to the server to acquire pieces of software recommended for upgrading by the server;

providing the prompting message corresponding to the pieces of software to be upgraded to the user if it is determined that there are some pieces of software to be upgraded in the terminal device based on the pieces of software recommended for upgrading.

Further, the step of providing the prompting message corresponding to the pieces of software to be upgraded to the user if it is determined that there are some pieces of software to be upgraded in the terminal device based on the pieces of software recommended for upgrading specifically comprises:

acquiring a predetermined number of target pieces of software to be upgraded based on the upgrading prompting weighting values of the pieces of software to be upgraded if it is determined that there are some pieces of software to be upgraded in the terminal device based on the pieces of software recommended for upgrading;

providing the prompting message corresponding to the target pieces of software in a form of pop-up box to the user.

Further, it also comprises: providing additional software information to the user.

Herein, the additional software information comprises at least one of following: software content comparison information, software usage tips, software provider information, software peripheral information, and software news information.

Embodiment X

Figure 10:
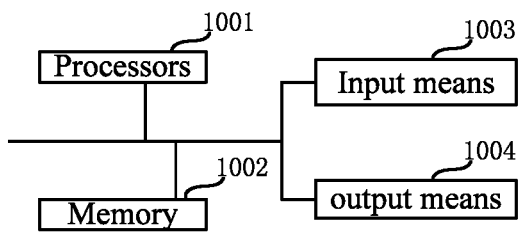
FIG. 10 is a flowchart of a device according to the tenth embodiment of the present invention.

Referring to FIG. 10, the present embodiment provides a hardware configuration of an apparatus, the apparatus comprises processors 1001, a memory 1002, an input means 1003, and an output means 1004; the number of the processors 1001 in the apparatus may be one or more, FIG. 10 takes one processors 1001 as the example. The processors 1001, memory 1002, input means 1003, and output means 1004 may be connected via a bus or other means, in FIG. 10 they are connected via a bus to serve as an example.

The memory 1002, as a computer-readable storage medium, can be used to store software programs, computer-executable programs and modules, such as the corresponding program instructions/units of the information providing method of the embodiments of the present invention (e.g. the software installation management information generating unit 91 and the software installation management information providing unit 92 shown in FIG. 9). The processors 1001 run the software programs, instructions, and modules stored in the memory 1002, so as to execute different functions and different kinds of data processing of the terminal device, i.e., realizing the information providing method in the above embodiments of method.

The memory 1002 may include a program storage area and a data storing area, wherein the program storage area may store the operating system, the necessary application for at least one function; the data storage area may store data created based on the use of the terminal device. Furthermore, the memory 1002 may include high-speed random access memory, and may also include nonvolatile memory, such as at least one disk storage devices, flash memory devices, or other non-volatile solid-state memory devices. In some examples, the memory 1002 may further include a memory disposed remotely with respect to the processors 1001, the remote memory can be connected to the server via a network. Examples of such networks include, but not limited to the Internet, an intranet, a local area network, a mobile communication network, and combinations thereof.

The input means 1003 may be used to input information of numbers or characters, and generates key signal input related to the user setting of the terminal device and function control. The output means 1004 may include a display screen and other display devices.

That is to say, the apparatus comprises:
one or more processors,
a memory,
one or more modules, which are stored in the memory and execute the following operation when executed by the one or more processors:

generating software installation management information based on the terminal personalized information and the pieces of software recommended for installation;

providing the software installation management information to the user.

Further, the software installation management information includes the information for the pieces of software to be installed; the personalized information includes: information for the pieces of software already installed and/or the information of the terminal user.

Further, the step of generating software installation management information based on the terminal personalized information and the pieces of software recommended for installation comprises:

excluding the pieces of software already installed in the terminal device from the pieces of software recommended for installation, and generating the information for the pieces of software to be installed.

Further, the step of generating software installation management information based on the terminal personalized information and the pieces of software recommended for installation comprises:

sorting the pieces of software recommended for installation based on the information of the terminal user and/or the popularity weighting values of the pieces of software recommended for installation, and selecting the information for the pieces of software to be installed from the result of sorting.

Further, the step of generating software installation management information based on the terminal personalized information and the pieces of software recommended for installation comprises:

excluding the pieces of software already installed in the terminal device from the pieces of software recommended for installation, and generating a first software group;

sorting the first software group based on the information of the terminal user and/or the popularity weighting values of the pieces of software recommended for installation;

selecting the information for the pieces of software to be installed from the result of sorting.

Further, the software installation management information also includes: the information for the pieces of software to be upgraded.

The step of generating software installation management information based on the terminal personalized information and the pieces of software recommended for installation further comprises:

generating the information for the pieces of software to be upgraded based on the information for the pieces of software already installed in the terminal device and the information of versions of the pieces of software recommended for installation.

Further, the step of providing the software installation management information to the user comprises:

determining the display layout of the information for the pieces of software to be upgraded and the information for the pieces of software to be installed;

providing the software management information to the user according to the display layout.

Further, the step of determining the display layout of the information for the pieces of software to be upgraded and the information for the pieces of software to be installed specifically comprises:

if it is determined that the number of the pieces of software already installed is less than a predetermined number threshold, providing the display layout position of the information for the pieces of software to be installed before that of the information for the pieces of software to be upgraded;

otherwise providing the display layout position of the information for the pieces of software to be upgraded before that of the information for the pieces of software to be installed.

Further, the step of determining the display layout of the information for the pieces of software to be upgraded and the information for the pieces of software to be installed specifically comprises:

if it is determined that installation time of the operating system of terminal device is less than a predetermined time threshold, providing the display layout position of the information for the pieces of software to be installed before that of the information for the pieces of software to be upgraded;

otherwise providing the display layout position of the information for the pieces of software to be upgraded before that of the information for the pieces of software to be installed.

Further, it also comprises:

sending an upgrade query request to the server to acquire pieces of software recommended for upgrading by the server;

providing the prompting message corresponding to the pieces of software to be upgraded to the user if it is determined that there are some pieces of software to be upgraded in the terminal device based on the pieces of software recommended for upgrading.

Further, the step of providing the prompting message corresponding to the pieces of software to be upgraded to the user if it is determined that there are some pieces of software to be upgraded in the terminal device based on the pieces of software recommended for upgrading specifically comprises:

acquiring a predetermined number of target pieces of software to be upgraded based on the upgrading prompting weighting values of the pieces of software to be upgraded if it is determined that there are some pieces of software to be upgraded in the terminal device based on the pieces of software recommended for upgrading;

providing the prompting message corresponding to the target pieces of software in a form of pop-up box to the user.

Further, it also comprises: providing additional software information to the user.

Herein, the additional software information comprises at least one of following: software content comparison information, software usage tips, software provider information, software peripheral information, and software news information.

With the above description of embodiments, those skilled in the art can clearly understand that the present invention can be realized with software and necessary general hardware, and of course, with hardware only, but in many cases the former is a better implementation. Based on such understanding, the technical nature of the invention or the part contributing to the prior art may be embodied in the form of pieces of software product, which may be stored in a computer readable storage medium, such as a computer diskette, read-only memory (ROM), random access memory (RAM), flash memory (FLASH), hard disk or optical disk, including a number of instructions to instruct a computer device (a personal computer, or network equipment) to execute various embodiments of the present invention.

It is worth noting that in the embodiments of the information providing device, the respective units and modules included therein are merely divided in accordance with the function logics, but the division is not limited to the above, any division will work as long as they can achieve the corresponding functions; in addition, the specific names of the functional units are distinguished from each other only to facilitate, not intended to limit, the scope of the present invention.

The above is only specific embodiments of the present invention, but the scope of the present invention is not limited thereto, any changes or replacements that any skilled in the art in the art can think of within the technical scope of the present disclosure shall fall within the scope of the present invention. Accordingly, the scope of the invention should be defined by the claims.

We claim:

1. An information providing method, executed by a computer, wherein the method comprises:

generating software installation management information based on terminal personalized information and pieces of software recommended for installation; and providing the software installation management information to a user, wherein, the software installation management information includes information for pieces of software to be installed and information for pieces of software to be upgraded;

the terminal personalized information includes information for pieces of software already installed in a terminal device and/or information of a user of the terminal device;

the generating software installation management information based on the terminal personalized information and the pieces of software recommended for installation comprises generating the information for the pieces of software to be upgraded based on the pieces of software already installed in the terminal device and information of versions of pieces of software recommended for installation; and providing the software installation management information to the user comprises:
  determining a display layout of the information for the pieces of software to be upgraded and the information for the pieces of software to be installed; and
  providing the software management information to the user based on the display layout, wherein,
  determining the display layout of the information for the pieces of software to be upgraded and the information for the pieces of software to be installed comprises:
    if it is determined that a number of the pieces of software already installed is less than a predetermined number threshold or that an installation time of an operating system of the terminal device is less than a predetermined time threshold, providing a display layout position of the information for the pieces of software to be installed before a display layout position of the information for the pieces of software to be upgraded;
    otherwise, providing the display layout position of the information for the pieces of software to be upgraded before the display layout position of the information for the pieces of software to be installed.

2. The method according to claim 1 wherein the step of generating software installation management information based on terminal personalized information and pieces of software recommended for installation comprises:
  excluding the pieces of software already installed in the terminal device from the pieces of software recommended for installation, and generating the information for the pieces of software recommended for installation.

3. The method according to claim 1 wherein the step of generating software installation management information based on terminal personalized information and pieces of software recommended for installation comprises:
  sorting the pieces of software recommended for installation based on the information of the user of the terminal device and/or popularity weighting values of the pieces of software recommended for installation;
  and selecting the information for the pieces of software to be installed from a result of the sorting.

4. The method according to claim 1 wherein the step of generating software installation management information based on terminal personalized information and pieces of software recommended for installation comprises:

excluding the pieces of software already installed in the terminal device from the pieces of software recommended for installation, generating a first software group;
sorting the first software group according to the information of the user of the terminal device and/or popularity weighting values of the pieces of software recommended for installation;
selecting the information for the pieces of software to be installed from a result of the sorting.

5. The method according to claim 1, wherein the method further comprises:
  sending an upgrade query request to a server to acquire pieces of software recommended for upgrading by the server;
  providing a prompting message corresponding to the pieces of software to be upgraded to the user if it is determined that there are some pieces of software to be upgraded in the terminal device based on the pieces of software recommended for upgrading.

6. The method according to claim 5, wherein the step of providing the prompting message corresponding to the pieces of software to be upgraded to the user if it is determined that there are some pieces of software to be upgraded in the terminal device based on the pieces of software recommended for upgrading comprises:
  acquiring a predetermined number of target pieces of software to be upgraded based on upgrading prompting weighting values of the pieces of software to be upgraded if it is determined that there are some pieces of software to be upgraded in the terminal device based on the pieces of software recommended for upgrading;
  providing the prompting message corresponding to the target pieces of software in a form of pop-up box to the user.

7. The method according to claim 1, wherein the method further comprises:
  providing additional software information to the user,
  wherein the additional software information comprises at least one of following: software content comparison information, software usage tips, software provider information, software peripheral information, and software news information.

8. A non-transitory computer storage medium storing a computer program, which when executed by one or more computers, cause the one or more computers to perform the following operations, the operations comprising:
  generating software installation management information based on terminal personalized information and pieces of software recommended for installation; and
  providing the software installation management information to a user, wherein,
    the software installation management information includes information for pieces of software to be installed and information for pieces of software to be upgraded;
    the terminal personalized information includes information for pieces of software already installed in a terminal device and/or information of a user of the terminal device;
    the generating software installation management information based on the terminal personalized information and the pieces of software recommended for installation comprises generating the information for the pieces of software to be upgraded based on the pieces of software already installed in the terminal device and information of versions of pieces of software recommended for installation; and
providing the software installation management information to the user comprises:
  determining a display layout of the information for the pieces of software to be upgraded and the information for the pieces of software to be installed; and
  providing the software management information to the user based on the display layout,
wherein,
  determining the display layout of the information for the pieces of software to be upgraded and the information for the pieces of software to be installed comprises:
    if it is determined that a number of the pieces of software already installed is less than a predetermined number threshold or that an installation time of an operating system of the terminal device is less than a predetermined time threshold, providing a display layout position of the information for the pieces of software to be installed before a display layout position of the information for the pieces of software to be upgraded;
    otherwise, providing the display layout position of the information for the pieces of software to be upgraded before the display layout position of the information for the pieces of software to be installed.

9. The non-transitory computer storage medium according to claim 8, wherein the operation of generating software installation management information based on terminal personalized information and pieces of software recommended for installation comprises:
  excluding the pieces of software already installed in the terminal device from the pieces of software recommended for installation, and generating the information for the pieces of software recommended for installation.

10. The non-transitory computer storage medium according to claim 8, wherein the operation of generating software installation management information based on terminal personalized information and pieces of software recommended for installation comprises:
  sorting the pieces of software recommended for installation based on the information of the user of the terminal device and/or popularity weighting values of the pieces of software recommended for installation;
  and selecting the information for the pieces of software to be installed from a result of the sorting.

11. The non-transitory computer storage medium according to claim 8, wherein the operation of generating software installation management information based on terminal personalized information and pieces of software recommended for installation comprises:
  excluding the pieces of software already installed in the terminal device from the pieces of software recommended for installation, generating a first software group;
  sorting the first software group according to the information of the user of the terminal device and/or popularity weighting values of the pieces of software recommended for installation;
  selecting the information for the pieces of software to be installed from a result of the sorting.

12. The non-transitory computer storage medium according to claim 8, wherein the operations further comprises:
  sending an upgrade query request to a server to acquire pieces of software recommended for upgrading by the server;
  providing a prompting message corresponding to the pieces of software to be upgraded to the user if it is determined that there are some pieces of software to be upgraded in the terminal device based on the pieces of software recommended for upgrading.

13. The non-transitory computer storage medium according to claim 12, wherein the operation of providing the prompting message corresponding to the pieces of software to be upgraded to the user if it is determined that there are some pieces of software to be upgraded in the terminal device based on the pieces of software recommended for upgrading comprises:
  acquiring a predetermined number of target pieces of software to be upgraded based on upgrading prompting weighting values of the pieces of software to be upgraded if it is determined that there are some pieces of software to be upgraded in the terminal device based on the pieces of software recommended for upgrading;
  providing the prompting message corresponding to the target pieces of software in a form of pop-up box to the user.

14. The non-transitory computer storage medium according to claim 8, wherein the operations further comprises:
  providing additional software information to the user;
  wherein the additional software information comprises at least one of following: software content comparison information, software usage tips, software provider information, software peripheral information, and software news information.

15. A device for updating an input method system on a server, comprising:
  at least one processor; and
  a memory storing instructions, which when executed by the at least one processor, cause the at least one processor to perform operations, the operations including:
  generating software installation management information based on terminal personalized information and pieces of software recommended for installation; and
  providing the software installation management information to a user, wherein,
    the software installation management information includes information for pieces of software to be installed and information for pieces of software to be upgraded;
    the terminal personalized information includes information for pieces of software already installed in a terminal device and/or information of a user of the terminal device;
    the generating software installation management information based on the terminal personalized information and the pieces of software recommended for installation comprises generating the information for the pieces of software to be upgraded based on the pieces of software already installed in the terminal device and information of versions of pieces of software recommended for installation; and
    providing the software installation management information to the user comprises:
      determining a display layout of the information for the pieces of software to be upgraded and the information for the pieces of software to be installed; and providing the software management information to the user based on the display layout, wherein, determining the display layout of the information for the pieces of software to be upgraded and the information for the pieces of software to be installed comprises:

if it is determined that a number of the pieces of software already installed is less than a predetermined number threshold or that an installation time of an operating system of the terminal device is less than a predetermined time threshold, providing a display layout position of the information for the pieces of software to be installed before a display layout position of the information for the pieces of software to be upgraded;

otherwise, providing the display layout position of the information for the pieces of software to be upgraded before the display layout position of the information for the pieces of software to be installed.

16. The device according to claim 15, wherein the operation of generating software installation management information based on terminal personalized information and pieces of software recommended for installation comprises:

excluding the pieces of software already installed in the terminal device from the pieces of software recommended for installation, and generating the information for the pieces of software recommended for installation.

17. The device according to claim 15, wherein the operation of generating software installation management information based on terminal personalized information and pieces of software recommended for installation comprises:

sorting the pieces of software recommended for installation based on the information of the user of the terminal device and/or popularity weighting values of the pieces of software recommended for installation;

and selecting the information for the pieces of software to be installed from a result of the sorting.

18. The device according to claim 15, wherein the operation of generating software installation management information based on terminal personalized information and pieces of software recommended for installation comprises:

excluding the pieces of software already installed in the terminal device from the pieces of software recommended for installation, generating a first software group;

sorting the first software group according to the information of the user of the terminal device and/or popularity weighting values of the pieces of software recommended for installation;

selecting the information for the pieces of software to be installed from a result of the sorting.

19. The device according to claim 15, wherein the operations further comprises:

sending an upgrade query request to a server to acquire pieces of software recommended for upgrading by the server;

providing a prompting message corresponding to the pieces of software to be upgraded to the user if it is determined that there are some pieces of software to be upgraded in the terminal device based on the pieces of software recommended for upgrading.

20. The device according to claim 19, wherein the operation of providing the prompting message corresponding to the pieces of software to be upgraded to the user if it is determined that there are some pieces of software to be upgraded in the terminal device based on the pieces of software recommended for upgrading comprises:

acquiring a predetermined number of target pieces of software to be upgraded based on upgrading prompting weighting values of the pieces of software to be upgraded if it is determined that there are some pieces of software to be upgraded in the terminal device based on the pieces of software recommended for upgrading;

providing the prompting message corresponding to the target pieces of software in a form of pop-up box to the user.

21. The device according to claim 15, wherein the operations further comprises:

providing additional software information to the user;

wherein the additional software information comprises at least one of following: software content comparison information, software usage tips, software provider information, software peripheral information, and software news information.

\* \* \* \* \*